(12) United States Patent
Smith et al.

(10) Patent No.: US 11,659,849 B2
(45) Date of Patent: May 30, 2023

(54) EMULSION FOR REDUCED FAT FOOD PRODUCTS

(71) Applicant: Cargill, Incorporated, Wayzata, MN (US)

(72) Inventors: Paul Raymond Smith, Waterloo (BE); Joël René Pierre Wallecan, Vilvoorde (BE)

(73) Assignee: Cargill, Incorporated, Wayzata, MN (US)

( * ) Notice: Subject to any disclaimer, the term of this patent is extended or adjusted under 35 U.S.C. 154(b) by 142 days.

(21) Appl. No.: 15/556,901

(22) PCT Filed: Mar. 10, 2016

(86) PCT No.: PCT/US2016/021758
§ 371 (c)(1),
(2) Date: Sep. 8, 2017

(87) PCT Pub. No.: WO2016/145185
PCT Pub. Date: Sep. 15, 2016

(65) Prior Publication Data
US 2018/0103654 A1    Apr. 19, 2018

(30) Foreign Application Priority Data
Mar. 10, 2015 (EP) .................................... 15158513

(51) Int. Cl.
| | | |
|---|---|---|
| *A23D 7/01* | (2006.01) | |
| *A23G 1/50* | (2006.01) | |
| *A23D 7/05* | (2006.01) | |
| *A23G 1/36* | (2006.01) | |
| *A23G 3/40* | (2006.01) | |
| *A23G 9/32* | (2006.01) | |
| *A21D 2/16* | (2006.01) | |
| *A23D 7/015* | (2006.01) | |
| *A23G 9/44* | (2006.01) | |

(52) U.S. Cl.
CPC ............... *A23G 1/50* (2013.01); *A21D 2/16* (2013.01); *A23D 7/011* (2013.01); *A23D 7/015* (2013.01); *A23D 7/05* (2013.01); *A23G 1/36* (2013.01); *A23G 3/40* (2013.01); *A23G 9/327* (2013.01); *A23G 9/44* (2013.01); *A23V 2002/00* (2013.01)

(58) Field of Classification Search
CPC ........................................................ A23D 7/00
See application file for complete search history.

(56) References Cited

U.S. PATENT DOCUMENTS

| | | | |
|---|---|---|---|
| 5,989,818 A | 11/1999 | Thurman et al. | |
| 6,322,842 B1 | 11/2001 | Reddy et al. | |
| 6,447,831 B1 * | 9/2002 | Daniels | A23D 7/001 |
| | | | 426/604 |
| 2004/0126475 A1 | 7/2004 | Hashizume et al. | |
| 2011/0135805 A1 * | 6/2011 | Doucet | A23D 7/013 |
| | | | 426/606 |

FOREIGN PATENT DOCUMENTS

| | | |
|---|---|---|
| EP | 0185000 A1 | 6/1986 |
| EP | 2614719 A1 | 7/2013 |
| WO | 2013050944 A2 | 4/2013 |
| WO | 2014066632 A1 | 5/2014 |

OTHER PUBLICATIONS

Frasch-Melnik, etc. "Fat-crystal stabilized w/o emulsions for controlled salt release". Journal of Food Engineering, 98 (2010) 437-442. (Year: 2010).*
"Emulsifiers and Antioxidants". Available online from EKO Trade Company, http://eko.by, as of 2003-2012. pp. 1-2. (Year: 2012).*
Norton, "Fat reduction in chocolate: a multidisciplinary approach considering emulsion science and consumer expectations", 2011 (University of Birmingham Doctoral Thesis). pp. 1-332. (Year: 2011).*
Frasch-Melnik, "Fat crystal-stabilized double emulsions", 2011 (University of Birmingham Doctoral Thesis). pp. 1-304. (Year: 2011).*
Ghosh, et al., "Fat crysials and water-in-oil emulsion stability", Current Opinion in Colloid and Interface Science, London, GB, vol. 16, No. 5. XP028294105, ISSN: 1359-0294, DOI:10.1016/J.COCIS. 2011.06.006, Jun. 9, 2011, 421-431.
Gosh et al. "Comparison of Pickering and network stabilization in water-in-oil emulsions," 2011, Langmuir, 27 (11):6589-97.
M. Douaire et al., "Fat crystallisation at oil-water interfaces", Advances in Colloid and Interface Science 203 (2014) 1-10.
Morley. W.G., "Reducing saturated fat using emulsion technology", Reducing saturated fats in foods, pp. 131-157, 2011.
Norton et al., "Effect of emulsifiers and fat crystals on shear induced droplet break-up, coalescence and phase inversion", Food Hydrocolloids 23 (2009) 1521-1526.
O'Brien, R.D., 2009, Chapter 10, "Margarine" in Fats and Oils-Formulating and processing for Applications. Taylor & Francis, pp. 447-470.
van Boekel, M.A.J., "Influence of fat crystals in the oil phase on stability of oil-in-water emulsions", 1980, 1.2 Stability of emulsions, p. 2 (107 total pages).

* cited by examiner

*Primary Examiner* — Jenna A Watts

(57) ABSTRACT

The invention relates to emulsions for use in food products. In particular, the invention relates to stable water-in-oil emulsions for reduced fat food products such as confectionery, spreads, and bakery goods.

20 Claims, 12 Drawing Sheets

EMULSION FOR REDUCED FAT FOOD PRODUCTS

CROSS-REFERENCE TO RELATED APPLICATIONS

This application is a national phase application of PCT/US2016/021758, filed Mar. 10, 2016, and entitled EMULSION FOR REDUCED FAT FOOD PRODUCTS, which claims the benefit of European Patent Application No. 15158513.0, filed Mar. 10, 2015, and entitled EMULSION FOR REDUCED FAT FOOD PRODUCTS, each of which is hereby incorporated by reference herein in its entirety.

FIELD OF INVENTION

The invention relates to emulsions for use in food products. In particular, the invention relates to stable water-in-oil emulsions for reduced fat food products such as confectionery, spreads, and bakery goods.

BACKGROUND

Rising levels of cardiovascular diseases in the western population is a huge concern for public health authorities. One way in which the food industry has responded is by seeking to provide food products with a reduced fat content. The consumption of saturated fatty acids is considered to have deleterious effects on blood cholesterol levels which, in turn, is considered to increase the risk of developing cardiovascular diseases.

Most fats in food are in the form of emulsions, such as margarine, spreads and butter. Previous attempts to reduce the levels of saturated fat in food have included reducing the total fat content, e.g. by replacing the fat with other ingredients, reducing the saturated component in the fat phase, or a combination of both (Morley, W. G., 2011. *Reducing saturated fats in foods*, pp.131-157).

Another method is to partially replace the fat phase with another substance, such as air or water. As water and fat are immiscible, replacing part of the fat-phase with water results in a water-in-oil emulsion (or sometimes an oil-in-water emulsion). Emulsions are inherently thermodynamically unstable. Stabilizing emulsions so that they can withstand the high mechanical and physical stresses of food manufacturing processes, and remain stable throughout the shelf-life of the product, presents a considerable challenge.

The addition of emulsifiers, such as monoacylglycerols (MAGs), to margarines for emulsion stability or protection against water drainage is known, usually at levels below 0.5% monoacylgylcerol (O'Brien, R. D., 2009, Chapter 10, "Margarine" in *Fats and Oils—Formulating and processing for Applications*. Taylor & Francis, pp. 447-470). However water-in-oil emulsions that utilise MAG emulsifiers alone are not sufficiently stable to withstand the physical stresses associated with most food preparation.

There is still a need for a stable water-in-oil emulsion that is suitable for replacing the fat in reduced fat food products.

SUMMARY OF INVENTION

The present invention seeks to address the problems identified above by providing an emulsion of an aqueous phase dispersed in a continuous fat phase, wherein the aqueous phase forms droplets in the continuous fat phase and one or more of the droplets is individually encased in a crystalline shell comprising crystalline monoacylglycerols and crystalline triacylglycerols, wherein the monoacylglycerols and the triacylglycerols each or together have a higher crystallization temperature than the continuous fat phase. It is thus understood that the emulsion comprises an aqueous phase and a fat phase. The fat phase comprises the crystalline shells (comprising the monoacylglycerols and the triacylglycerols) and the continuous fat phase, which is the bulk of the fat phase.

The monoacylglycerols and the triacylglycerols may comprise fatty acids with the same alkyl chain length. Alternatively, the monoacylglycerols and the triacylglycerols may comprise fatty acids with alkyl chains that differ in length by up to two carbons, i.e. by 1 or 2 carbon atoms. Further, the fatty acid of the monoacylglycerol may be longer than at least one fatty acid of the triacylglycerol. For example, the monoacylglycerols comprise glycerol monostearate and the triacylglycerols comprise at least one palmitic acid moiety.

Further, the monoacylglycerols and triacylglycerols may comprise fatty acids with the same degree of saturation. Further, the monoacylglycerols and triacylglycerols may comprise fatty acids which are fully saturated.

Further, the monoacylglycerols and triacylglycerols may comprise the same fatty acids. For example, the monoacylglycerols comprise glycerol monostearate and the triacylglycerols comprise glycerol tristearate. For example, the monoacylglycerols comprise glycerol monopalmitate and the triacylglycerols comprise glycerol tripalmitate. For example, the monoacylglycerols comprise glycerol monostearate and glycerol monopalmitate and the triacylglycerols comprise glycerol tristearate and glycerol tripalmitate.

The monoacylglycerols and triacylglycerols may be pure or part of a mixture. The triacyglycerol mixture may be selected from fully hydrogenated canola oil, palm super stearin, palm stearin, shea stearin, hydrogenated rapeseed oil, hydrogenated sunflower oil, lard, tallow, stearins and superstearins (i.e. double fractionated) of tropical oils, high stearic vegetable oils, cocoa butter stearin, or interesterified versions thereof.

Preferably, the crystalline shell further comprises a non-crystallizing emulsifier, preferably polyglycerol polyricinoleate and/or lecithin.

Preferably, at least 90%, or at least 95%, of the droplets are individually encased by a crystalline shell.

Preferably, the crystalline shell consists of crystalline monoacylglycerols, crystalline triacylglycerols, and optionally a non-crystallizing emulsifier, wherein the monoacylglycerols and the triacylglycerols each or together have a higher crystallization temperature than the continuous fat phase.

The difference between the crystallization temperature of the monoacylglycerols and the crystallization temperature of the triacylglycerols is preferably at most 20° C., or at most 15° C., or at most 10° C., or at most 5° C. Preferably further, the monoacylglycerols and triacylglycerols have approximately the same crystallization temperature, or an identical crystallization temperature.

Preferably, the crystallization temperature of the monoacylglycerols and the triacylglycerols, each or together, is at least 8° C. higher, or at least 10° C. higher, or at least 20° C. higher, or at least 30° C. higher than the crystallization temperature of the continuous fat phase.

Further preferably, the emulsion comprises:
a. from 5 to 90 wt % of the aqueous phase; and
b. from 95 to 10 wt % of the fat phase.

Further preferably, the emulsion comprises:
c. From 0.5 to 10 wt % of triacylglycerols comprised in crystalline shells; and
d. From 0.1 to 5 wt % of monoacylglycerols comprised in crystalline shells; and
e. From 0 to 3 wt % of non-crystallizing emulsifier comprised in crystalline shells,
wherein the balance is made up of the aqueous phase and the continuous fat phase.

Preferably, the aqueous phase includes dissolved solutes, preferably selected from amongst nutrients and micronutrients, sugar, sweeteners (e.g. high intensity sweeteners), salt, flavourings, preservatives, amino acids, peptides, vitamins, fruit juices, antioxidants (e.g. polyphenols), aromatics and ingredients sensitive to oxidization. The aqueous phase may consist of water. The aqueous phase may comprise liquid milk from bovine, equine or ovine sources and/or vegetable milk, alcohol and pharmaceuticals. The aqueous phase may further comprise thickening or gelling agents.

Preferably, the continuous fat phase is selected from fractions of, or interesterified, or hydrogenated, or single or blends of a vegetable oil, palm oil, coconut oil, palm kernel oil, soyabean oil, groundnut oil, canola oil, rapeseed oil, sunflower oil, corn oil, cottonseed oil, peanut oil, shea oil, sal oil, mango kernel oil, or illipe oil.

The emulsion of the invention may be for use in a food product.

The invention further provides a food product comprising the emulsion of the invention. The food product may be a confectionery product, such as a coating composition, a filling composition, a chocolate product, including a compound coating or filling, or it may be a bakery product or spread. The food product may also be an ice cream.

The invention also provides a formulation comprising monoacylglycerols, triacylglycerols, and optionally a non-crystallizing emulsifier, for stabilizing an emulsion of an aqueous phase dispersed in a continuous fat phase, wherein the monoacylglycerols and the triacylglycerols each or together have a higher crystallization temperature than the continuous fat phase.

The invention also provides for the use of a formulation comprising monoacylglycerols, triacylglycerols, and optionally a non-crystallizing emulsifier, to stabilise an emulsion of an aqueous phase dispersed in a continuous fat phase, wherein the monoacylglycerols and the triacylglycerols each or together have a higher crystallization temperature than the continuous fat phase.

The invention further provides aqueous droplets individually encased in crystalline shells comprising crystalline monoacylglycerols, crystalline triacylglycerols, and optionally further comprising a non-crystallizing emulsifier.

The invention also provides a process for producing an emulsion of an aqueous phase dispersed in a continuous fat phase comprising the steps of:
a. mixing the aqueous phase and the continuous fat phase with monoacylglycerols and triacylglycerols that each or together have a higher crystallization temperature than the continuous fat phase, and optionally a non-crystallizing emulsifier, at a temperature above the crystallization temperature of the continuous fat phase, monoacylglycerols, and triacylglycerols; and
b. homogenizing the mixture to obtain an emulsion; and
c. cooling the emulsion to a temperature below the crystallisation temperature of the monoacylglycerols and the triacylglycerols and above the crystallisation temperature of the continuous fat phase, whilst stirring; and
d. recovering the emulsion.

The process further may comprise a step after step c and before step d of cooling the emulsion to a temperature below the crystallisation temperature of the continuous fat phase.

The homogenization step b may be carried out under high shear, such as for example from 5000 to 15000 rpm, preferably from 10000 to 15000 rpm.

Preferably the cooling rate during step c is of ±0.01 to ±4° C./min, preferably of ±0.1 to ±3° C./min, more preferably of ±0.5 to ±2° C./min, even more preferably of ±0.75 to ±1° C./min. For example the cooling step may be carried out at a rate of less than 0.5° C./minute or at a rate of 0.1° C./minute or less, or at a rate of 0.01° C./minute.

BRIEF DESCRIPTION OF FIGURES

Specific and non-limiting examples of the invention, in all its aspects, will be described with reference to the accompanying figures, in which.

Figure 1:
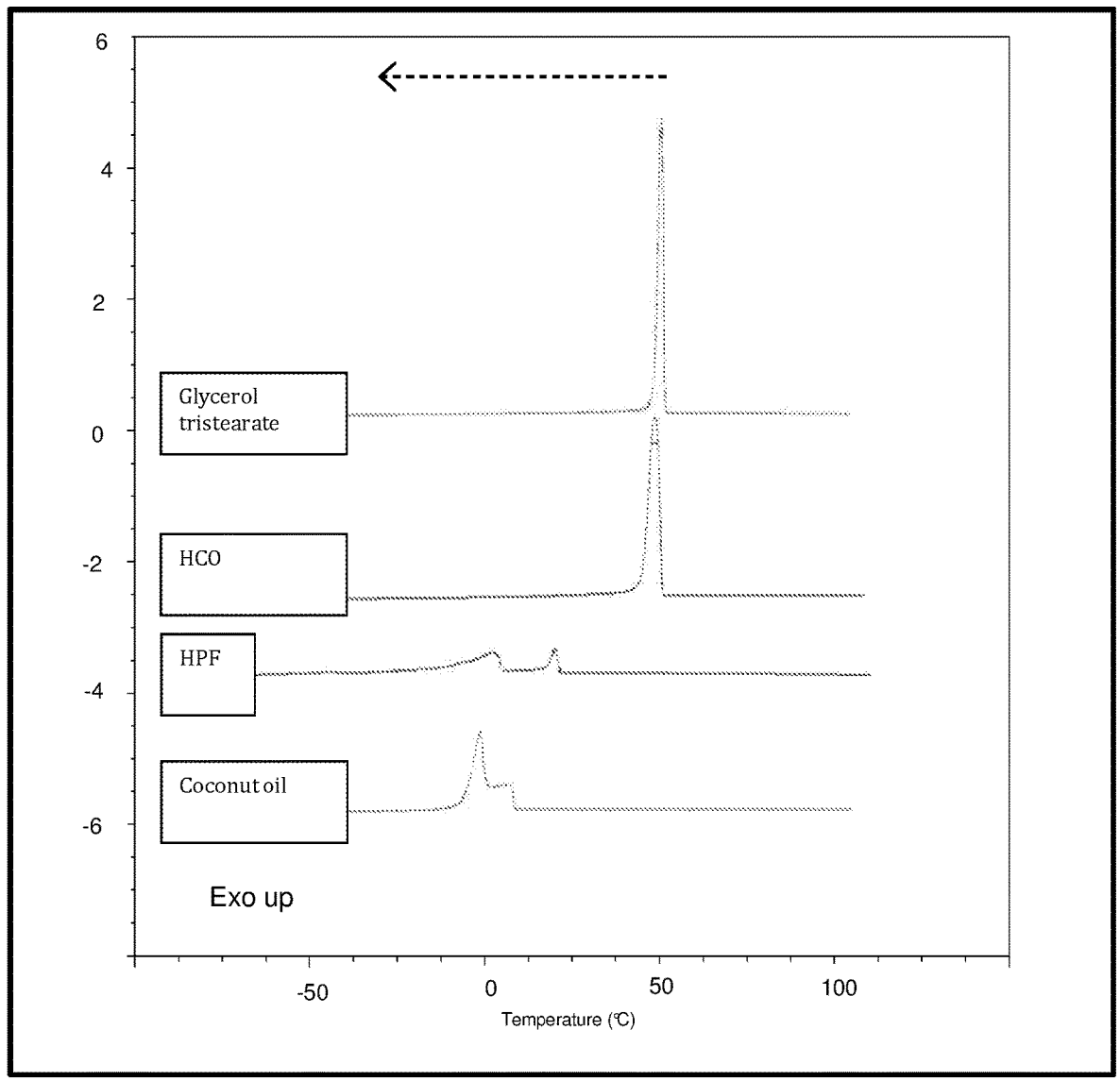
FIG. 1: Shows thermogram of temperature cycle I cooling step for various TAG mixtures (Glycerol tristearate, HCO, HPF and coconut oil).

When not specified in the figures, MAG is SBK and TAG is HCO.

DETAILED DESCRIPTION

Terms and Abbreviations

Explanations of abbreviations and terms used in this disclosure are provided to assist in comprehending and practicing the invention.

When used in this specification and claims, the terms "comprises" and "comprising" and variations thereof mean that the specified features, steps or integers are included. The terms are not to be interpreted to exclude the presence of other features, steps or components.

All ratios of emulsion components refer to percentage by weight (wt %), unless otherwise specified.

All parameter ranges disclosed include the end-points and all values in between, unless otherwise specified.
CMC=critical micelle concentration
DAG=diacylglycerol
DSC=differential scanning calorimetry
FFA=free fatty acid
GMO=glycerol monooleate
GMP=glycerol monopalmitate
GMS=glycerol monostearate
HCO=hydrogenated canola oil
HPF=hydrogenated palm fat
LVR=linear viscoelastic region
MAG=monoacylglycerol
PBK=ALPHADIM® 90 PBK
PGPR=polyglycerol polyricinoleate
PLM=polarized light microscopy
RVA=rapid visco analyser
SBK=ALPHADIM® 90 SBK
TAG=triacylglycerol Crystallization temperature: the temperature at which solid crystals precipitate out from a fluid solution or melt.

Emulsifier: Amphiphillic substance that stabilizes the interface between the phases of an emulsion by reducing interfacial tension.

Emulsion: Mixture containing two immiscible liquids or an immiscible liquid and a solid, in which one liquid is dispersed as droplets or globules throughout the other or throughout the solid. The dispersed liquid is called the dispersed phase or discontinuous, whilst the other liquid is called the continuous or bulk phase. In a water-in-oil emulsion, the water is the dispersed phase, and the lipid (oil or fat) is the continuous phase.

Emulsion stability: A measure of how the properties of an emulsion change over time. Instability is generally caused by: flocculation, coalescence, Ostwald ripening creaming/sedimentation and/or phase inversion (Morley, W. G., 2011, *Reducing Saturated fats in foods*, pp. 131-157). When droplets approach each other and the film between the droplets ruptures, this can lead to merging of the droplets. This is known as coalescence. (Norton, I. T., 2009. *Food hydrocolloids,* 23(6) pp. 1521-1526.) Flocculation may be defined as the capture of particles to form aggregates (van Boekel, M. A. J., 1980. *Influence of fat crystals in the oil phase on stability of oil-in-water emulsions*). Ostwald ripening is the growth of large droplets at the expense of small droplets, driven by the difference in chemical potential between having a small and a large droplet as opposed to one large droplet. Creaming/sedimentation is phase separation due to density differences.

A stable emulsion remains substantially unchanged over time even under destabilizing conditions such as high temperature fluctuations or mechanical agitation.

Emulsion stability can be measured using a variety of techniques known in the art, such as light scattering, focused beam reflectance measurements, freeze-thaw cycling, salt release experiments, centrifugation, and rheology. Protocols for these techniques are set out the examples, under the heading "materials and methods".

Over time an unstable water-in-oil emulsion will separate into its constituent phases and the oil phase will form a layer on top of the aqueous phase (as the aqueous phase has a higher density).

Fatty acid: a carboxylic acid with a long aliphatic tail (chain), which is either saturated or unsaturated. Fatty acids may be attached to other molecules, particularly glycerol. When they are not attached to other molecules, they are known as "free" fatty acids.

Food product: any manufactured product suitable for consumption by humans or animals. In the context of the invention, food product refers to a product which would normally contain fat. Exemplary food products are confectionery products, bakery products, and spreads (e.g. butter or margarine).

Monoacylglycerols (MAGs) and Triacylglycerols (TAGs): a Monoacylglycerol consists of a glycerol backbone attached to exactly one fatty acid molecule via an ester bond to one of three different positions on the glycerol backbone. A Triacylglycerol consists of a glycerol backbone esterified with three fatty acids which may vary in two manners, namely the fatty acids (chain length, saturation) and their position on the glycerol backbone (there are three binding sites on the glycerol backbone).

Nucleation: is the initial stage of crystal growth. Two types of nucleation can occur, namely primary and secondary nucleation. Primary nucleation occurs when no crystals are present yet. When there is an accumulation of molecules in the liquid state and a nucleus is formed, this is called homogeneous nucleation. When an external nucleus (e.g. an impurity) promotes nucleation, this is termed heterogeneous nucleation. Secondary nucleation occurs when crystals of the same species are present. The nuclei, once formed, are a starting point for crystal growth.

TAGs can nucleate in specific conformations/orientations (Douaire, M et. al., 2014. *Advances in colloid and interface science,* 203, pp.1-10); the three fatty acids can pack into two configurations: the chair formation and the tuning fork configuration.

Polyglycerol polyricinoleate (PGPR): a non-crystallizing emulsifier (it does not crystallize in a temperature range of −80° C. to 120° C.). PGPR is a synthetic polymer that is used in food systems and is frequently used in water-in-oil emulsions.

Lecithin: the term lecithin is used for mixtures of phospholipids and triglycerides. The main glycerol-containing phospholipids in lecithin are phosphatidyl choline, phosphatidyl inositol, phosphatidyl ethanolamine and phosphatide acid, further referred to herein as PC, PI, PE, and PA, respectively. The actual composition of phospholipids depends on the source of the lecithin.

Super Isol lecithin can be defined as Phosphatidyl Choline (PC) depleted lecithin or Phosphatidyl Ethanolamine (PE) enriched lecithin, preferably it is as defined in WO2014066632, except that LPC is optional:
A phospholipid emulsifier composition comprising Phosphatidyl Choline (PC), optionally Lyso Phosphatidyl Choline (LPC), Phosphatidyl Inositol (PI), Phosphatidyl Ethanolamine (PE) and Phosphatidic Acid (PA), wherein the emulsifier has a phospholipid ratio R1:R2 in the range of from 1:1 to 1,7:1, wherein R1 is defined as the weight ratio of phospholipid components according to general formula I:

$$R1 = \frac{PC + LPC + PI + PA}{PE},\qquad(I)$$

and wherein R2 is defined as the weight ratio of phospholipid components according to general formula II:

$$R2 = \frac{PC + LPC + PI}{PE + PA}.\qquad(II)$$

DESCRIPTION OF INVENTION

At least one aspect of the invention is based on the unexpected finding that emulsions having aqueous droplets dispersed in a continuous fat phase, which droplets are individually encased within crystalline shells comprising crystalline MAGs and TAGs, and optionally PGPR, have improved stability. Such emulsions are so stable that they can withstand the stresses associated with food preparation and may therefore be useful in the manufacture of reduced fat food products by replacing all or part of the fat in the food products.

Emulsion Composition

The emulsion of the invention is generally of the water-in-oil type. The emulsion comprises an aqueous phase and a fat phase. The fat phase comprises crystalline shells (comprising the monoacylglycerols and the triacylglycerols) and a continuous fat phase. The aqueous phase, i.e. the phase comprising water, is dispersed throughout the continuous fat phase, such that the aqueous phase forms droplets in the continuous fat phase.

The shape and size of the aqueous droplets depends on several factors, including the ratio of aqueous phase to fat phase, and the amount of interfacial tension. When the water content is low, the dispersed water will tend to minimize the interfacial area and therefore will mainly form spheres. However, the aqueous droplets may take alternative forms. The size of the aqueous droplets is approximately 0.2 µm to 50 µm, preferably 0.5 µm to 30 µm, more preferably 1 µm to 20 µm.

Crystalline shells comprising MAGs and TAGs are formed around the aqueous droplets when the temperature of the emulsion is below the crystallization temperature of the MAGs and TAGs (when heated above the crystallization temperature of the MAGs and TAGs, the MAGs and TAGs from the crystalline shell mix with the continuous fat phase).

The crystalline shells encase, i.e. encapsulate or surround, the aqueous droplets so that the aqueous phase is contained within the crystalline shell. Ideally, the droplets are fully encased. This encasement prevents the aqueous phase from leaking out of the shell and into the surrounding continuous fat phase, which stabilises the emulsion. The denser the crystalline shell structure, the better the encapsulation of the water droplet(s).

Preferably, at least 90%, or at least 91% or at least 92%, or at least 93%, or at least 94%, or at least 95%, or at least 96%, or at least 97%, or at least 98%, or at least 99% of the droplets are individually encased in crystalline shells. Further preferably, 100% of the droplets are individually encased in crystalline shells. The higher the proportion of encased droplets, the higher the emulsion stability as there is a lower chance of water leakage. Measurement of the percentage of encased droplets is as described below.

At room temperature, most of the lipid components of the emulsion are solid and the crystalline shells around the aqueous droplets are harder than the continuous fat phase.

The aqueous phase of the emulsion comprises water, but preferably also includes dissolved solutes that are suitable for food products, such as nutrients, sugar, sweeteners (e.g. high intensity sweeteners), salt (e.g. NaCl, KCl, or a mixture of the two), flavourings, preservatives, amino acids, peptides, vitamins, fruit juices, antioxidants (e.g. polyphenols), and ingredients sensitive to oxidization.

The dissolved solutes are selected to impart desirable characteristics to a particular food product. For example, sweeteners may be dissolved in the aqueous phase when the emulsion is intended to be used in a confectionery product. The addition of salt is advantageous for flavour, but also because it improves the stability of the emulsion by reducing Ostwald ripening. Salt may also contribute to the preservation of the food product by retarding microbial growth. The aqueous phase may further comprise thickening or gelling agents, such as hydrocolloids (e.g. gelatine), locust bean gum, or xanthan gum. Further the aqueous phase may consist entirely of water.

Preferably, purified water is used in the aqueous phase to reduce contamination and microbial growth in the food product.

The continuous fat phase may be any edible fat, including, but not limited to fractions of, or interesterified, or hydrogenated, or single or blends of a vegetable oil, palm oil, coconut oil, palm kernel oil, soyabean oil, groundnut oil, canola oil, rapeseed oil, sunflower oil, corn oil, cottonseed oil, peanut oil, or shea oil.

Although the fat in the continuous phase may comprise TAGs and MAGs, these TAGs and MAGs are chemically distinct from those in the crystalline shells surrounding the water droplets as those in the crystalline shell are selected to have a higher crystallization temperature (each or together) than the continuous fat phase. In view of this difference in temperature, the MAGs and TAGs from the crystalline shell crystallise separately from the continuous phase and the MAGs and TAGs that might be present in the continuous phase, thereby substantially avoiding network crystallisation of the shell with the continuous fat phase. The present invention provides for crystalline shells distinctive from the continuous fat phase.

For optimal droplet stability, the emulsion of the invention advantageously comprises from about 5 to 80 wt %, preferably from 10 to 60 wt %, more preferably from 20 to 50 wt %, yet even more preferably from 30 to 40 wt % of aqueous phase, and correspondingly from about 20 to 95 wt %, preferably from 90 to 40 wt %, more preferably from 80 to 50 wt %, even more preferably from 70 to 60 wt % of fat phase.

When higher concentrations of aqueous phase are included, it is advantageous to reduce the droplet size to reduce the occurrence of coalescence. This may be achieved by adding an emulsifier, such as PGPR, to the emulsion.

Preferably, the emulsion comprises, in the crystalline shell, from 0.5 to 10 wt % of triacylglycerols, from 0.1 to 5 wt % of monoacylglycerols, the balance of the fat phase being made up of the continuous fat phase.

Preferably, the emulsion further comprises, in the crystalline shell from 0 to 3 wt %, more preferably from 0 to 2 wt %, even more preferably from 0 to 1 wt % of non-crystallizing emulsifier.

The balance of the emulsion is made up of the aqueous phase and the continuous fat phase.

Crystalline Shell Composition

As described above, the crystalline shell comprises or consists of exogenous MAGs and TAGs that are specifically selected and added to the emulsion. The shells are formed by co-crystallization of the MAGs and TAGs around the aqueous droplets.

The chosen MAGs and TAGs may be added to the emulsion in one or more pure formulations, or else mixtures may be added that contain a high concentration of the chosen MAGs and TAGs.

Preferably, a single type of MAG and a single type of TAG is chosen. However, a selection of different MAGs may be chosen, as can a selection of different TAGs.

The MAGs and TAGs are selected to have a higher crystallization temperature than the continuous fat phase. This enables the shells to crystallize around the aqueous droplets in a controlled two-step crystallization process as described below, and results in the shell being harder than the surrounding fat phase at room temperature, stabilizing the emulsion.

The crystallization temperature of the MAGs and TAGs must be at least room temperature (approximately 23° C. on average). Preferably, the crystallization temperature of the monoacylglycerols and the triacylglycerols is at least 8° C. higher, or more preferably at least 10° C. higher, or even more preferably at least 20° C. higher, or most preferably at least 30° C. higher than the crystallization temperature of the continuous fat phase. Below 8° C. difference, it may be difficult to form the crystalline shells in a controlled way because some parts of the fat phase may begin to crystallize before the shell has been fully formed.

Figure 2:
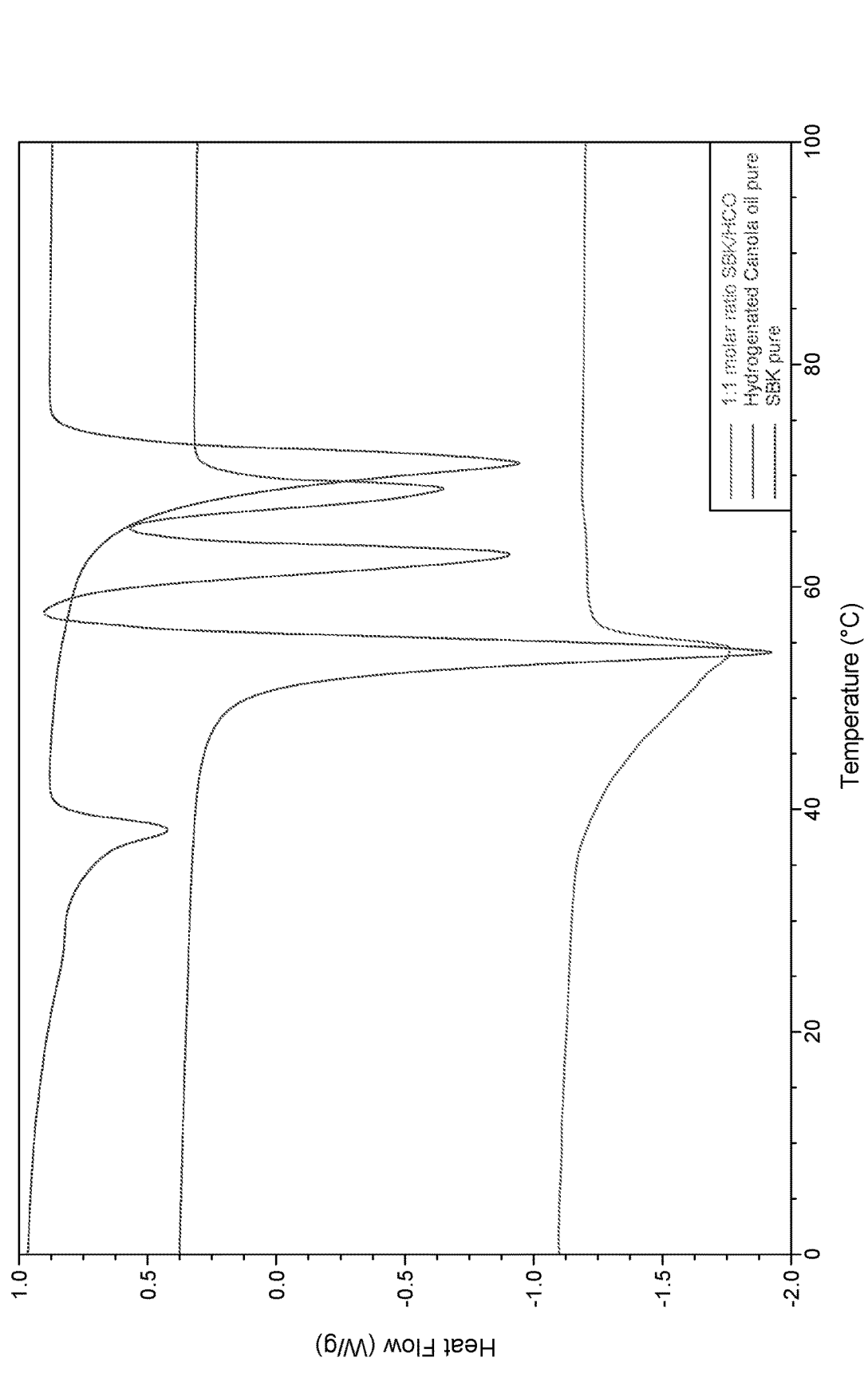
FIG. 2: Shows thermogram of temperature cycle I second heating step of mixture of HCO and SBK and the separate components.

Preferably, the MAGs and TAGs have identical or similar crystallization temperature to each other. This promotes co-crystallization. If the crystallization temperatures are different, there is preferably only a small temperature difference, for example the difference between the crystallization temperature of the MAGs and the crystallization temperature of the TAGs may be at most 20° C., or more preferably at most 15° C., or still more preferably at most 10° C., or most preferably at most 5° C. The lower the difference between said crystallization temperatures, the higher the compatibility between the MAGs and TAGs and the better they will co-crystallize. Improved co-crystallization allows that the MAGs co-crystallize with the TAGs at the surface of the aqueous droplets instead of crystallizing in the continuous fat phase. This improves further the emulsion stability. Co-crystallization can be viewed with Differential Scanning calorimetry. In case of co-crystallisation, the DSC profile will show that the crystallization peak of the MAGs overlaps with the crystallization peak of the TAGs or that new crystallisation peaks are present compared to the ones of the individual components (FIG. 2).

The crystallization temperature of each of the MAGs and TAGs may be higher than the crystallization temperature of the continuous fat phase, or the crystallization temperature of the combined system may be may be higher than the crystallization temperature of the continuous fat phase. In other words, the MAGs and TAGs may each or together have a higher crystallization temperature than the continuous fat phase.

The co-crystallization of MAGs and TAGs to form the crystalline shell is improved when the fatty acid in the MAGs and, preferably each of, the fatty acids in the TAGs have the same or similar alkyl chain lengths. This permits the MAGs and TAGs to fit together closely, like pieces of a puzzle, with minimal spaces between molecules. This in turn results in a denser crystalline shell structure that further improves emulsion stability.

The length of the fatty acid chains in the MAGs and TAGs may differ to a small degree, e.g. up to 2 carbons, without significantly affecting their molecular compatibility to form a crystalline shell structure. For example, the triacylglycerols may comprise one or two or three different fatty acids that have an alkyl chain length that differs from the alkyl chain length of the monoacylglycerol by one, two, three, or four carbons. For example, the monoacylglycerols may comprise stearic acid or behinic acid, and the triacylglycerols may comprise at least one palmitic acid. Where the lengths differ, preferably, the fatty acid in the monoacylglycerol is longer than the fatty acids in the triacylglycerol.

Preferably, at least two of the fatty acids on the triacylglycerols have the same alkyl chain length and/or level of saturation. More preferably each of the three fatty acids on the triacylglycerols has the same alkyl chain length and/or level of saturation. Even more preferably, two out of the three the fatty acids are identical or all of the fatty acids at each of the three positions are identical.

Co-crystallization is also improved when the fatty acid in the MAGs and, preferably each of, the fatty acids in the TAGs have the same or a similar level of saturation as this improves molecular compatibility. Preferably, the fatty acid of the MAGs and each of the fatty acids of the TAGs are fully saturated.

For optimal molecular compatibility, the triacylglycerols should comprise the same fatty acids, i.e. the same fatty acid profile, as the monoacylglycerols. For example, when the monoacylglycerols comprises glycerol monostearate, the triacylglycerols comprise glycerol tristearate. The monoacylglycerols may comprise glycerol monopalmitate and the triacylglycerols may comprise glycerol tripalmitate. Alternatively, the monoacylglycerols may comprise glycerol monostearate and glycerol monopalmitate and the triacylglycerols may comprise glycerol tristearate and glycerol tripalmitate.

The monoacylglycerols and/or triacylglycerols may be pure or they may be from a mixture. For example, the triacylglycerols may be from fully hydrogenated canola oil (HCO), particularly when the monoacylglycerols comprise glycerol monostearate. HCO is a mixture which contains a high concentration of glycerol tristearate. Other triacylglycerol mixtures that may be useful in the invention include coconut oil, HPF, palm stearin, palm super stearin, shea stearin, lard, tallow, and SBK.

Although palmitic acid (C16:0) and stearic acid (C18:0) are primarily given as examples above, the invention is not limited to MAGs and TAGs comprising these fatty acids. The MAGs and TAGs used in the invention may comprise other fatty acids, particularly other saturated fatty acids, such as, C3:0, C4:0, C5:0, C6:0, C7:0, C8:0, C9:0, C10:0, C11:0, C12:0, C13:0, C14:0, C15:0, C17:0, C19:0, C20:0, C21:0, C22:0, C23:0, C24:0, C25:0, C26:0, C27:0, C28:0, C29:0, C30:0, C31:0, C32:0, C33:0, C34:0, C35:0, or C36:0. For use in food products, the selected fatty acid should be approved by the relevant regulatory body.

Further, the crystalline shell may comprise monobehenate and monoarachadate.

Further, the crystalline shell may comprise a non-crystallizing emulsifier, PGPR and/or lecithin, more preferably PGPR and/or super ISOL lecithin. This improves the emulsion stability by reducing the droplet size distribution and the droplet size. It is known that when droplets are larger, the droplet will sediment quicker than when the droplet size is smaller. Droplet sizes of less than 10 μm were found to be advantageous as this resulted in an improved shelf life due to reduced microbial growth.

Emulsion Stability

Emulsions in accordance with the invention are very stable, meaning that phase separation does not occur over an extended period of time (at room or refrigeration temperatures).

Emulsion stability may be assessed by different techniques known in the art, including freeze-thaw cycling as described in example 7. It was found that the crystalline shells of the invention did not break when subjected to certain large temperature fluctuations.

The shells also provide an effective barrier to entrap the dispersed aqueous phase and can sustain a reasonable amount of stress, preventing their disruption during mixing processes used during food manufacture.

Emulsions of the invention were found to remain stable for at least three months at room temperature.

Process of Making the Emulsion

The emulsions of the present invention are formed by a two-step crystallization process which is described further below.

In summary, first a suitable combination of MAGs and TAGs is selected which each or together have a crystallization temperature above the crystallization temperature of the particular continuous fat phase being used. The selected MAGs and TAGs are then mixed with the selected continuous fat phase and aqueous phase and homogenized to obtain an emulsion at a temperature which is above the crystallization temperature of the continuous fat phase and the MAGs and TAGs.

The emulsion is then cooled to a temperature which is below the crystallization temperature of the selected MAGs and TAGs, but above the crystallization temperature of the continuous fat phase (first cooling). This allows the selected MAGs and TAGs to co-crystallize out of the fat phase and surround the aqueous droplets as continuous crystalline shells.

The emulsion may optionally then be cooled further to a temperature below the crystallization temperature of the continuous fat phase, causing this phase to crystallize (further cooling).

The emulsion may subsequently be recovered using techniques known in the art.

The homogenization step may be carried out using any method known in the art, for example using a micro fluidiser, or preferably a high-shear mixer.

It was found that the cooling of the emulsion to a temperature below the crystallization temperature of the selected MAGs and TAGs, but above the crystallization temperature of the continuous fat phase must be carried out a certain rate, i.e. the cooling must be a controlled cooling. Shock cooling (e.g. from >50° C. to 4° C.) caused the emulsions to separate instantly. Preferably the cooling rate is such that the emulsion does not separate. Preferably the cooling rate is of ±0.01 to ±4° C./min, preferably of ±0.1 to ±3° C./min, more preferably of ±0.5 to ±2° C./min, even more preferably of ±0.75 to ±1° C./min. However, the appropriate rate is dependent on the ratio of MAGs to TAGs used. For example, when emulsions were prepared with ≥0.8 wt % MAG and 2 wt % TAG, the phases separated during the cooling step when cooled at a cooling rate of ±0.5° C./min. This destabilisation occurred at ±40° C. Whereas, emulsions with ≤0.7 wt % MAG did not phase separate during cooling at the same rate. When both of these emulsions were cooled at a low cooling rate of ±0.01° C./min, stable emulsions were formed.

Further, it has also been found that controlled cooling may be stopped once substantially all the MAGs and TAGs have crystallized as shells around the aqueous droplets. Controlled cooling may be done but is not found to be essential for crystallisation of the continuous fat phase.

Stirring the emulsion during the first cooling step was found to be essential. Without stirring, the emulsion destabilized and phase separation occurred and the droplets sedimented and coalesced prior to shell formation. Stirring can be done with high and medium shear mixing rates, such as for example at least 300 rpm, preferably from 400 to 12000 rpm, more preferably 1000 to 12000 rpm, even more preferably from 5000 to 12000 rpm. Stirring the emulsion during the further cooling is not essential however it is preferred to stir also during this cooling.

Use in Food Products

Emulsions according to the present invention may be used in the production of food products. By replacing all or part of the conventional fat in a food product with the emulsion of the invention, a reduced fat food product may be produced. Preferably, processing temperatures should be kept below the melting temperature of the shells, at least from the moment the emulsion is used in the process of making the food product. This is to say, the emulsion should not be processed at a temperature higher than the melting temperature of the shells.

For example, during chocolate manufacture, cocoa butter may be replaced by an emulsion of the invention, to produce a reduced fat chocolate product. Likewise, when making bakery products such as bread or pastries, an emulsion of the invention can be used instead of butter or shortening. The emulsions may also be used directly as a reduced fat spread instead of butter or margarine.

Formulations

A formulation of crystalline shell-forming moieties may be produced and sold separately for adding to an existing emulsion of an aqueous phase and a fat phase. The formulation comprises monoacylglycerols, triacylglycerols, and optionally non-crystallizing emulsifier, all as described herein. The formulation may be used to stabilize the emulsion.

Separation of Aqueous Droplets

The aqueous droplets encased by the crystalline shells can be separated from the continuous fat phase by centrifugation without destroying the crystalline shells, as shown in the examples below. This can serve to concentrate the emulsion.

Determination of Crystallization Temperature

The crystallization temperature of the continuous fat phase will depend on the crystallization temperatures of the constituents, which will include MAGs, TAGs FFAs, and DAGs. As a mixture, the continuous fat phase will have a lower melting point than the constituent lipid molecules.

The crystallization temperature of the continuous fat phase and the MAGs and TAGs may be determined by any method known in the art, including temperature cycling and DSC, as discussed in the examples below.

The invention will now be described by the following non-limiting examples.

EXAMPLES

Materials and Methods

Different mixtures of MAGs were analysed, namely ALPHADIM® 90 SBK (87% glycerol monostearate (GMS), 12% glycerol monopalmitate (GMP)) and ALPHADIM 90 PBK (Corbion, USA) and Grindsted® C.rystallizer 110 and Dimodan® HP (Danisco, Denmark).

Different mixtures of high melting TAGs were analysed namely fully hydrogenated canola oil (HCO) (86-96% C18:0, 4-8% C16:0) (Cargill, Germany), hydrogenated palm fat (HPF) (Cargill, Belgium) and coconut oil (45-48% C12:0, 16-20% C14:0, 8-11% C16:0) (Cargill, the Netherlands). Glycerol tristearate (99% glycerol tristearate) (Nu-Chek. Prep. Inc., USA) was analysed.

For the preparation of the emulsions tap water or Milli-Q water (Millipore, USA) with commercially available salt were used. Emulsions contained approximately 66 wt % water. Salt was added to the water to reduce the Ostwald ripening and retard microbial growth.

DSC Measurements

The crystallization and melting behaviour of fats and emulsions was studied with differential scanning calorimetry (DSC). A change in the polymorphic form or in the physical state (molten or crystallized) of fats is accompanied by a heat flow.

All heating and cooling rates were ±5° C./min An empty pan was used as a reference. All thermograms were presented "exo up" and analysed with use of the software Universal Analysis 2000 (TA Instruments, USA). Dashed arrows indicated the direction of the event.

Characterization of Fats

Temperature cycle I: A sample (3-15 mg) was weighed into an aluminium pan and covered after which it was temperature cycled in a Q2000 DSC (TA Instruments, USA). The sample was heated from −80° C. to 120° C. at 5° C./min, where it was held for 3 min. Then, the sample was cooled down to −80° C. at 5° C./min, where it was held for 3 min. A second heating cycle heated the sample up to 120° C. again.

Characterization of Emulsion

Temperature cycle II: A sample (3-15 mg) was weighted into a high pressure pan and covered after which it was temperature cycled in a Q100 DSC (TA Instruments, USA). The sample was cooled from 20° C. to −80° C. at 5° C./min.

Freeze-Thaw Stability

Temperature cycle III: A sample (3-15 mg) was weighted into high pressure pans and covered after which it was temperature cycled in a Q100 DSC (TA Instruments, USA). The sample was cooled from 20° C. to −80° C. at 5° C./min and heated from −80° C. to 20° C. at 5° C./min. This freeze-thaw cycle was repeated 10 times.

The amount of non-encapsulated water was calculated by dividing the enthalpy of the non-encapsulated water peak by the total enthalpy of the encapsulated and non-encapsulated water.

Emulsification

The oil phase and aqueous phase were heated and magnetically stirred on a heating plate to 80° C. in order to erase all thermal history. Then both phases were cooled down (at ≈1° C./min) to a certain temperature while being magnetically stirred at 500 rpm. The water-in-oil emulsion (66:33) was mixed in a T 25 ultraturrax (IKA, Germany) for 2 minutes at speed 12 (12000 rpm).

The mixture was brought in a double vessel connected to a water bath and cooled to 4-6° C. while being stirred with a stirrer. The emulsion was cooled to 4-6° C. which was chosen because it is expected that the interface will be fully crystallized at this temperature. The cooling rate was monitored with a thermocouple.

Morphology of the Emulsions

The droplet size distribution was determined by light scattering. The emulsion was diluted in oil and brought in an oil cone accessory of a Mastersizer 2000 (Malvern Instruments, UK). The cone was flushed with sunflower oil at least three times between every measurement. A refractive index of 1.33 was taken for water and 1.47 for oil. The absorption value for the water was taken 0.01. The data were analysed using the Mastersizer 2000 software (Malvern Instruments, UK).

Figure 3:
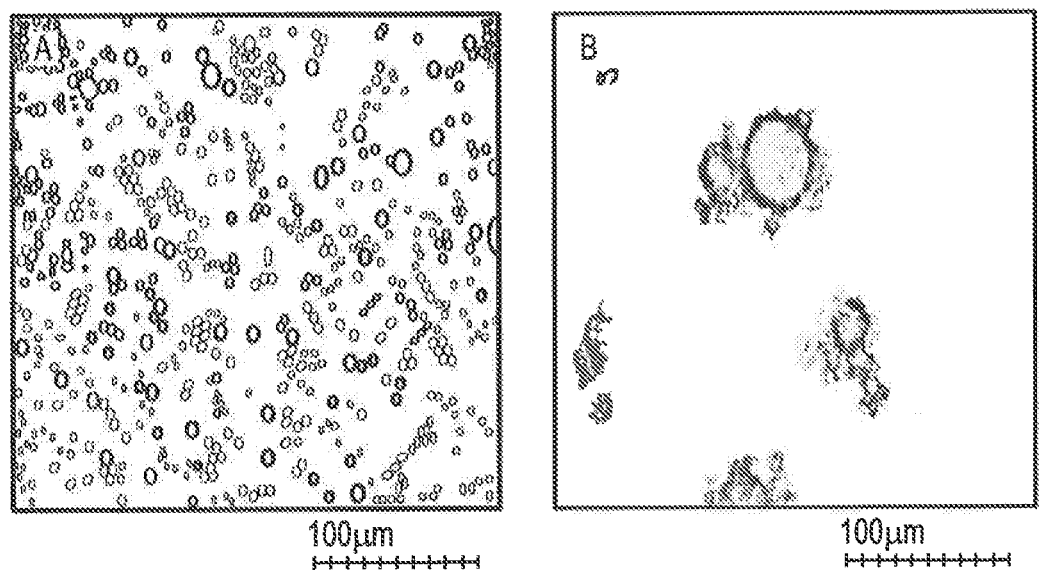
FIG. 3: Shows microscope views A: Diluted emulsion (emulsion comprises 5.4 wt % TAG, 0.16 wt % MAG, 0.42 wt % PGPR, 40 wt % water and the balance is made up of sunflower oil. Said emulsion is diluted in sunflower oil, dilution level is 1/10) and B: Diluted emulsion (emulsion comprises 0.16 wt % MAG, 5.4 wt % TAG, 40 wt % water and the balance is made up of sunflower oil. Said emulsion is diluted in sunflower oil at a dilution level of 1/10). 400× Enlarged, polarized light and scale bar=100 μm.

The morphology of all emulsions was examined with an Axioskop 2 polarized light microscope (Zeiss, Germany) after dilution in oil. All slides were prepared at room temperature. A drop of the sample was placed in the centre of a slide after which it was covered with a cover slip. Observations were made through 10×, 20× and 40× objectives which enlarge the image 100, 200 and 400 times, respectively. Images were acquired with polarized light. FIG. 3 provides a representative illustration of the obtained water droplets encapsulated in crystalline shells.

The percentage of droplets encapsulated with crystalline shells is measured as follows:

%encapsulated=(enthalpy water peak at −49° C.)/(total enthalpy of crystallized water)

Centrifugation

The cooled emulsion was diluted (1:8 or 1:4) with sunflower oil and stirred on a magnetic stirring plate. The diluted emulsion was transferred to 50 mL conical centrifuge tubes and centrifuged in a Labofuge 400 centrifuge (Thermoscientific, USA) at 3000 RCF for 10 minutes. The supernatant was removed.

Example 1

Selection of MAGs and TAGs for Crystal Shell Formation

It can be seen in FIG. 1 that the crystallization peaks of HCO and glycerol tristearate resembled each other greatly. The samples both crystallized from melt in a single sharp peak with peak temperature 50° C. The glycerol tristearate comprises >99% glycerol tristearate, whereas HCO comprises 86-96% fatty acids with C18:0. It could be seen that HPF and coconut oil differed greatly in the number of crystallization peaks (multiple vs. singular) and the temperature range of crystallization compared to glycerol tristearate. Therefore, HCO is a suitable mixture to substitute for pure glycerol tristearate.

The subsequent heating of the HCO:SBK mixture together with the separate components is presented in FIG. 2. Fats can form co-crystals when they have similar fatty acid chain lengths and/or levels of unsaturation. SBK and HCO showed different melting peaks than the individual components in a similar temperature range. Therefore, SBK was expected to be able to co-crystallize in a eutectic mixture with HCO.

Example 2

Optimization of Emulsification Process

Equipment

The emulsions were prepared by pre-mixing the aqueous and the fat phase with the Ultraturrax. After the emulsification step, the emulsion was cooled in a water bath.

Cooling Rate

When the emulsions were shock-cooled from >50° C. to 4° C., the emulsions separated instantly. When the same emulsions were cooled from >50° C. to a lower temperature, e.g. 25° C. or 4° C., at +/−0.1° C./min, the emulsions did not separate.

It was visually observed that emulsions prepared with ≥0.8 wt % MAG (and 2 wt % TAG) phase separated during the cooling step when cooled at a cooling rate of ±0.5° C./min. This destabilization occurred around ±40° C. Whereas, emulsions with ≤0.8 wt % MAG did not phase separate during cooling at the same cooling rate.

When emulsions were cooled at a low cooling rate (±0.01° C./min) stable emulsions were formed.

Stirring

It was visually observed that without stirring during cooling, the emulsion destabilized and phase separation occurred and the droplets sedimented and coalesced prior to shell formation.

Example 3

Impact of PGPR on Droplet Size

In FIG. 3 microscopic images are presented of an emulsion with added PGPR and an emulsion without added PGPR. As can be seen in panel A, the average droplet size was 2-5 μm when PGPR was added. When PGPR was not added, the average droplet size was 15-40 μm as can be seen in panel B. When PGPR was not added, it seemed that the polydispersity was higher.

Example 4

Emulsion Characterization with Particle Size Distribution (PSD)

Figure 4:
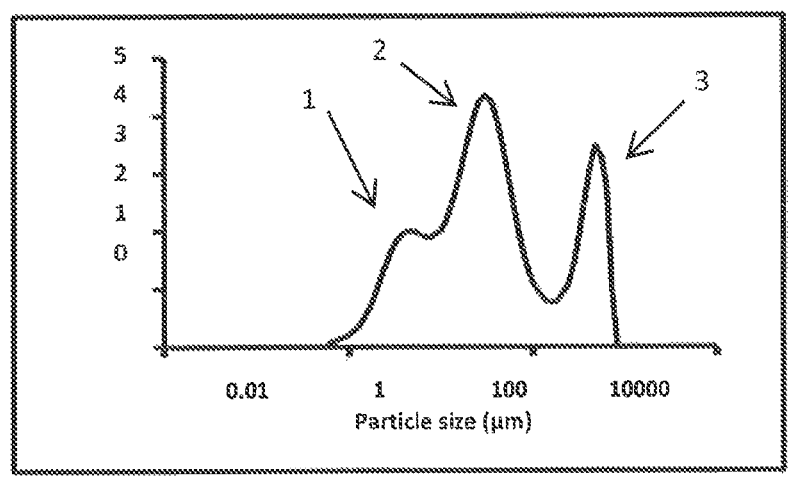
FIG. 4: Shows a particle size distribution (PSD) measurement with laser diffraction where peak 1 relates to water droplets, peak 2 relates to flocculated water droplets, and peak 3 relates to air bubbles.

A PSD pattern is presented in FIG. 4. Three peaks can be distinguished from this graph with average sizes of about 20-30 μm (1), 90 μm (2) and 300 μm (3) (from left to right). The respective peaks can likely be ascribed to water droplets, flocculated water droplets and air bubbles.

Figure 5:
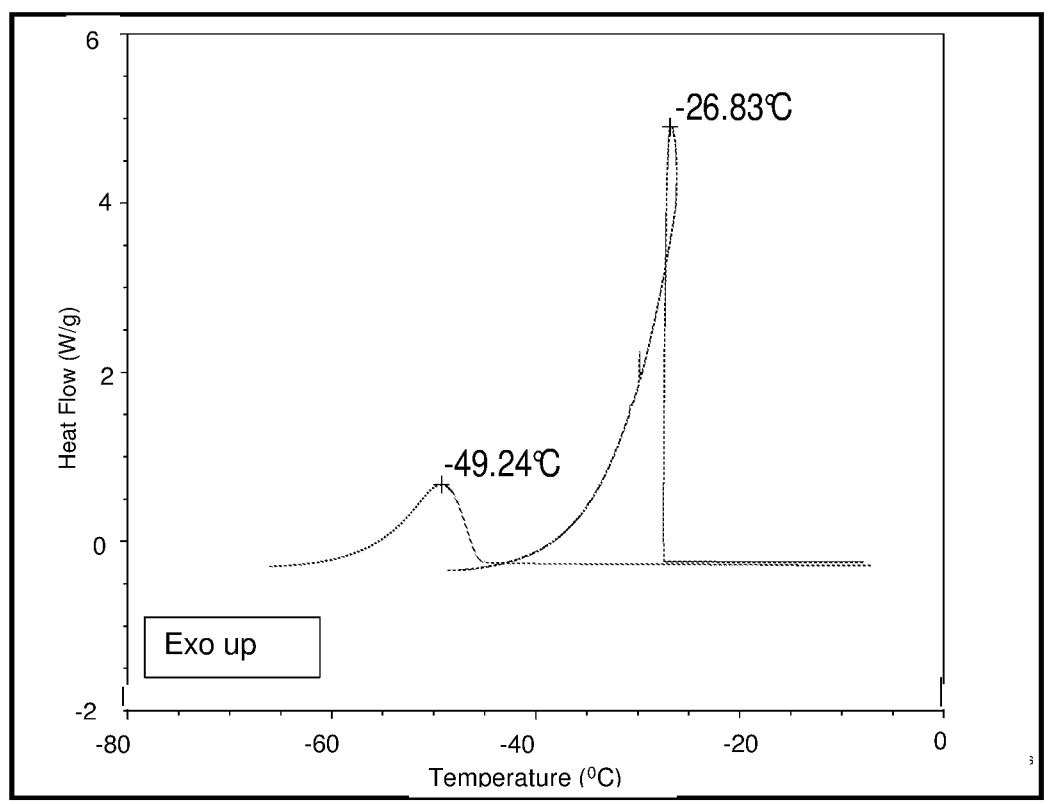
FIG. 5: Shows a thermogram of temperature cycle 1 cooling step of emulsified encapsulated water and non-encapsulated water.

The droplet size distribution can also be indicated with DSC because the crystallization behaviour of materials is different whether the material is dispersed or not. Air bubbles will not interfere with these measurements. Tap water with 1.6 wt % added salt crystallized between −20° C. to −30° C. in a sharp single peak as can be seen in FIG. 5. The salt caused freezing-point depression. When water was emulsified with PGPR, it crystallized at lower temperatures (−40° C. to −60°) in a Gaussian shaped peak which can be seen in FIG. 5. The dispersed phase required more undercooling, even more undercooling is needed when the dispersed phase was encapsulated, because of the restricted mobility of the encapsulated water. Crystallization peaks of dispersed water and non-dispersed water differ in two ways namely the peak temperature and the shape. It is found that when the droplet size is smaller, the crystallization temperature is lower. So, the peak temperature gives an indication about the average size of the droplets. Also, the shape of the crystallization peak gives information about the droplet size distribution. In the case of a narrow Gaussian shape, the polydispersity is low. When there are multiple peaks which are asymmetrical, the polydispersity is high.

Figure 6:
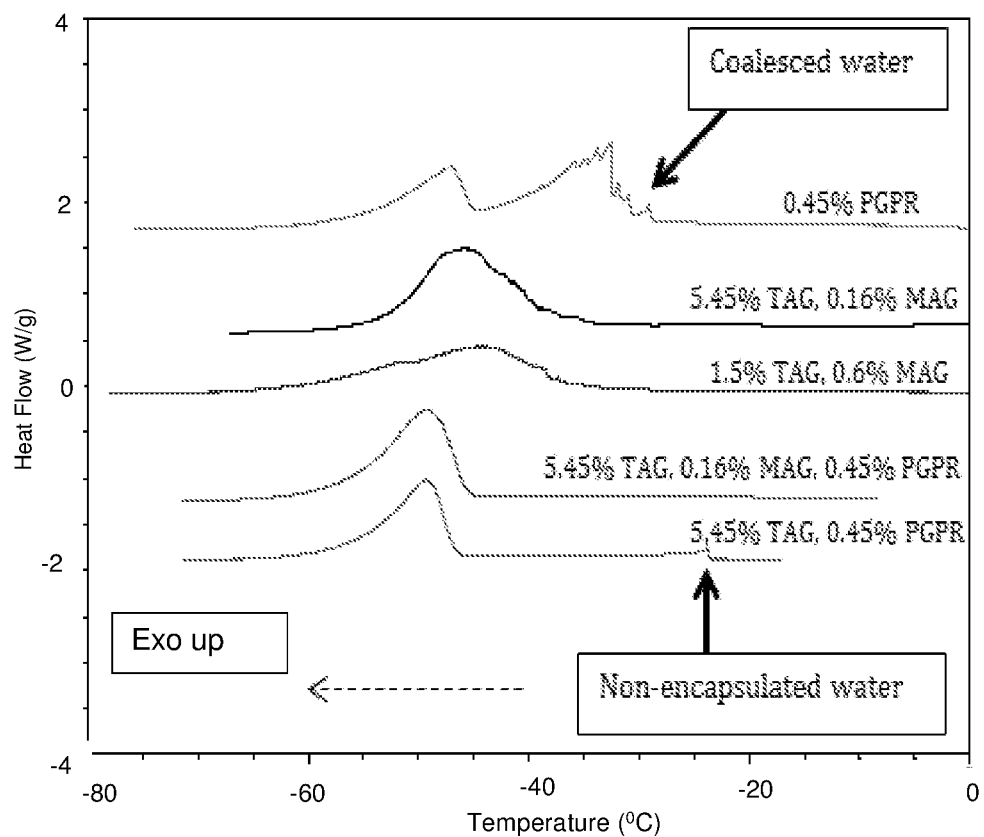
FIG. 6: Shows a thermogram of temperature cycle II cooling step for different MAG/TAG/PGPR formulations.

In FIG. 6 the characterization of emulsions with different formulations is presented. It can be seen that the emulsions differed greatly in droplet size and polydispersity. Emulsions stabilized solely by PGPR showed the existence of a large amount (60%) of large coalesced water droplets. Emulsions stabilized by PGPR and TAGs also showed (5%) non-encapsulated water. All the other emulsions, with MAGs, were mainly consisting of encapsulated water droplets. Therefore it could be concluded that MAGs contributed to the encapsulation of the water droplets.

The effect of the addition of PGPR on the width of the peak and the peak temperature is presented in Table 1. When PGPR was added the Gaussian shape was narrower (16° C.) than when PGPR was not added (22° C.). This difference indicated the droplet size distribution to be smaller than when PGPR was not added. It seemed that PGPR helped to create emulsions with less polydispersity. Also, the peak temperature of the crystallization peak with PGPR was found lower (−49° C.) than without PGPR (−45° C.). As observed during microscopy measurements, the addition of PGPR caused the formation of a smaller average droplet size and less polydispersity. Furthermore, it could be seen that when the crystallization material (amount of MAG and TAG) was increased, the width of the peak became smaller and therefore it can be concluded that by increasing the material, the polydispersity could be decreased.

TABLE 1 width of the crystallization peaks and peak temperatures for different emulsions.

|  | 5.45% TAG 0.16% MAG | 5.45% TAG 0.16% MAG 0.45% PGPR | 1.5% TAG 0.6% MAG |
|---|---|---|---|
| Width of peak | 22° C. | 16° C. | 36° C. |
| Peak temperature | −45° C. | −49° C. | −45° C. |

Example 5

Freeze-Thaw Stability

Emulsions can destabilize because of the effects of freezing. When MAGs (and TAGs) are located at the interface, the interface is expected to be rigid and solid at low temperatures. This is in contrast to PGPR which remains liquid during the entire freezing cycle. The interfacial film, when rigid, could rupture because of the expansion of water when it would crystallize into ice. When the rigid film ruptures, the droplets coalesce into a larger droplet. The interfacial film, when liquid, would expand together with the ice giving no resistance to expansion. When the emulsion is sufficiently packed (which it is, for example, with 66 wt % water) the droplets can approach each other and the droplets would coalesce during thawing. Coalescence causes the crystallization peak to shift to a higher temperature because of the increased droplet size. Also, the droplets could not be dispersed anymore at all. When the crystallization behaviour is analysed it acts as non-encapsulated water which is significantly different from how dispersed water would act (see FIG. 5).

The effect of freezing can be analysed by freeze-thaw-cycling emulsions multiple times. The effect of the first freezing cycle would become apparent during the second freezing cycle. The effect of the freeze-thaw cycling gives a direct indication of the shells' mechanical properties.

Figure 7:
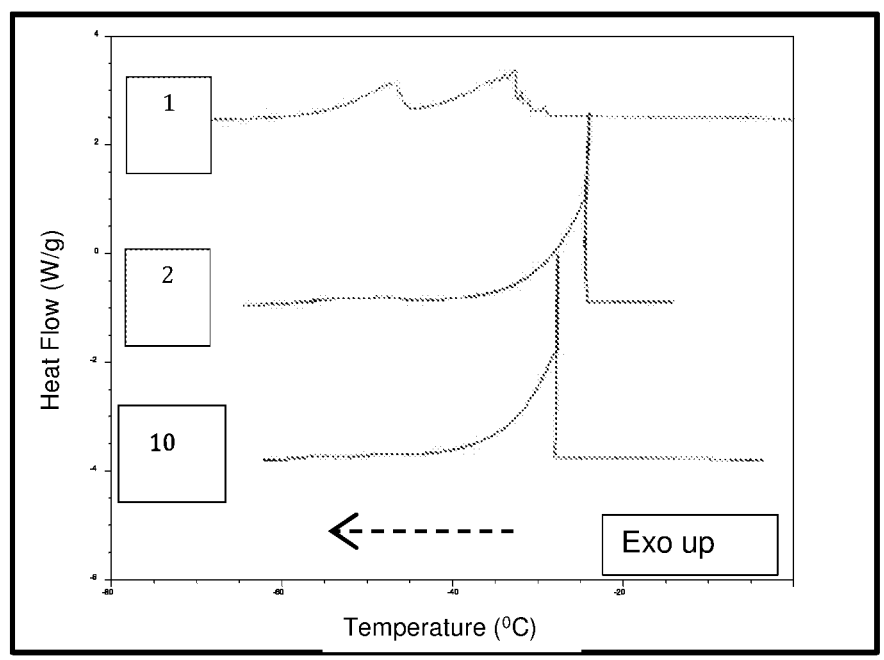
FIG. 7: Shows a thermogram of temperature cycle III from top to bottom first cycle, second cycle and tenth cycle of emulsion (0.45 wt % PGPR, 40 wt % of water, continuous fat phase is sunflower oil).

An emulsion which was solely stabilized by PGPR was prepared and temperature cycled according to temperature cycle III. In FIG. 7 it can be seen that after the first freezing cycle there was a large amount of de-emulsification (≈8% emulsified water), after 9 freezing cycles there was complete de-emulsification (<1% emulsified water). It seems that the emulsion destabilizes completely during freezing. The hypothesis that PGPR doesn't show resistance against expansion was confirmed.

Figure 8:
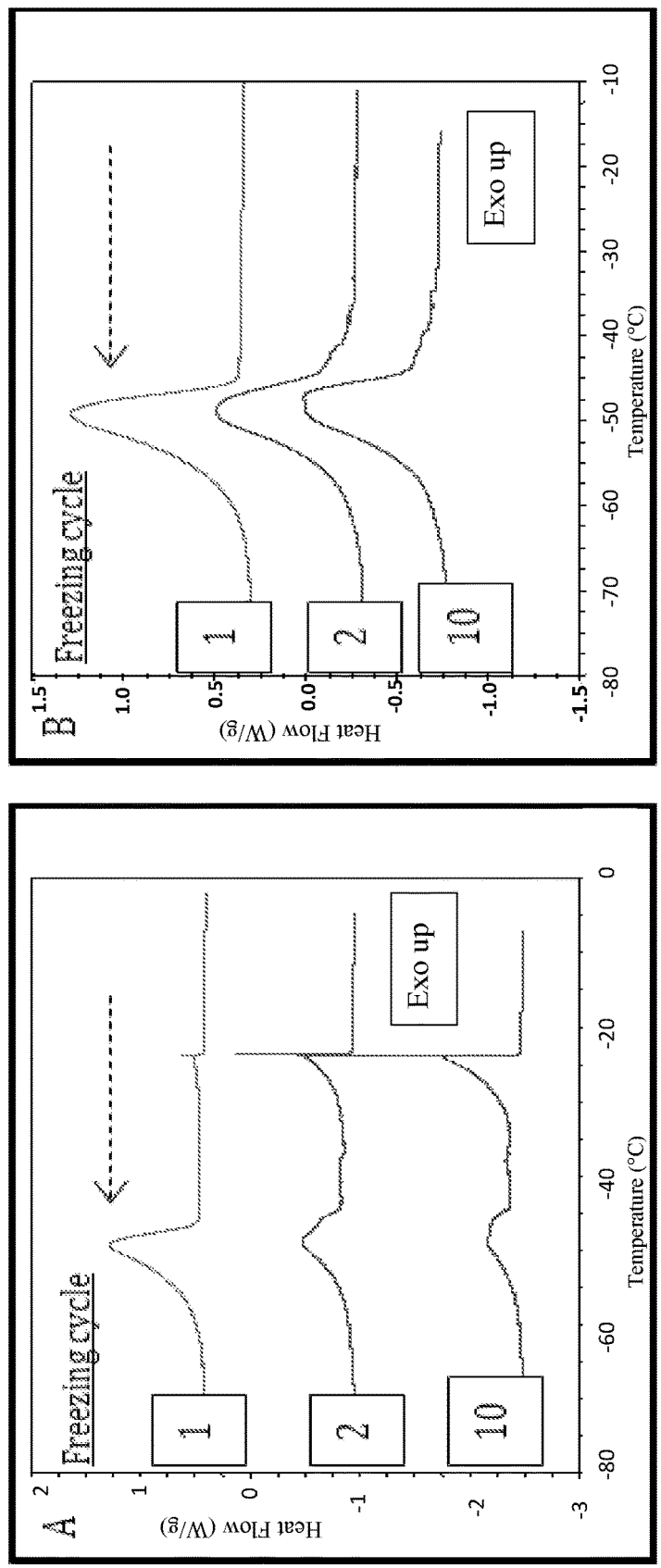
FIG. 8: Shows thermograms of temperature cycle III from top to bottom first cycle, second cycle and tenth cycle of emulsions A (0.45 wt % PGPR and 5.45 wt % TAG) and B (0.45 wt % PGPR, 5.45 wt % TAG, and 0.16 wt % MAG). The emulsions comprise 40 w % water, and the balance is made up with continuous fat phase (sunflower oil).

Different emulsions, with and without MAGs, were prepared and temperature cycled. The first, second and tenth freezing cycles are compared in FIG. 8. The emulsion prepared without MAGs already contained non-encapsulated water from the beginning, namely 11% non-encapsulated water. After the first freezing cycle, 50% of the water was non-encapsulated and after 9 freezing cycles 67% was non-encapsulated. In contrast, when MAGs were added to the emulsion, no de-emulsification occurred during 10 freezing cycles. It seems that MAGs indeed contribute to the rigidity of the interfaces which can resist breaking due to ice expansion. From this it can be concluded that MAGs contribute significantly to the freeze-thaw stability.

Example 6

Separation of Water Droplets

The aim of centrifugation was twofold. The first aim was to separate the water droplets from the continuous phase (sunflower oil), to concentrate the emulsion in fact. The second aim of the centrifugation was to dispose of any non-encapsulated water (if present). It was found that the emulsion needed to be diluted to facilitate phase separation during centrifugation. The sedimentation velocity increases when the viscosity of the continuous phase decreases. The degree of dilution that was necessary depended on the quantity of MAGs and TAGs added. This is logical because when there was more MAG and TAG added this would result in a higher viscosity of the continuous phase. The general rule was; the higher the quantity added the more dilution necessary.

Figure 9:
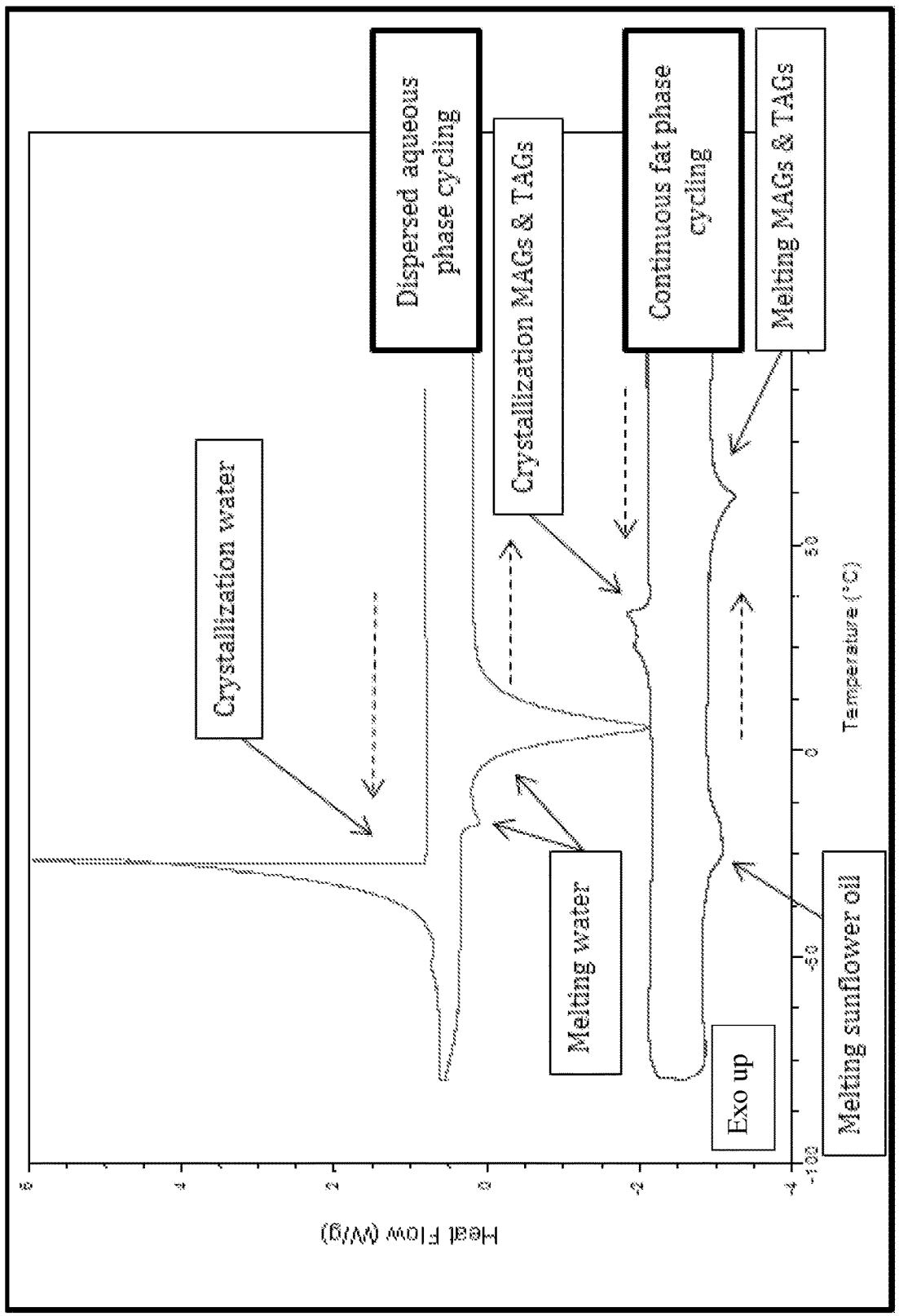
FIG. 9: Shows thermogram of temperature cycle I of water phase and sunflower oil comprising MAGs and TAGs phase prior to emulsification.

The temperature cycling of the aqueous phase and the continuous fat phase are presented in FIG. 9. The aqueous phase showed a crystallization peak (Tpeak −26° C.) during cooling and two melting peaks (Tpeak −18° C., 6° C.) during heating. The continuous fat phase showed a crystallization peak (Tpeak 34° C.) during cooling and two melting peaks (Tpeak −24° C., 62° C.) during heating. The melting peak (Tpeak −24° C.) corresponded with the melting of the sunflower oil. The melting peak with (Tpeak 62° C.) corresponded with the melting of the MAGs and TAGs. These characteristic peaks could now be used to allocate the components in the centrifugation fractions.

After the centrifugation of the diluted emulsion, two phases were separated namely the supernatant on top and the residue on bottom (sometimes three phases were present namely the supernatant, residue and non-encapsulated water from top to bottom).

Figure 10:
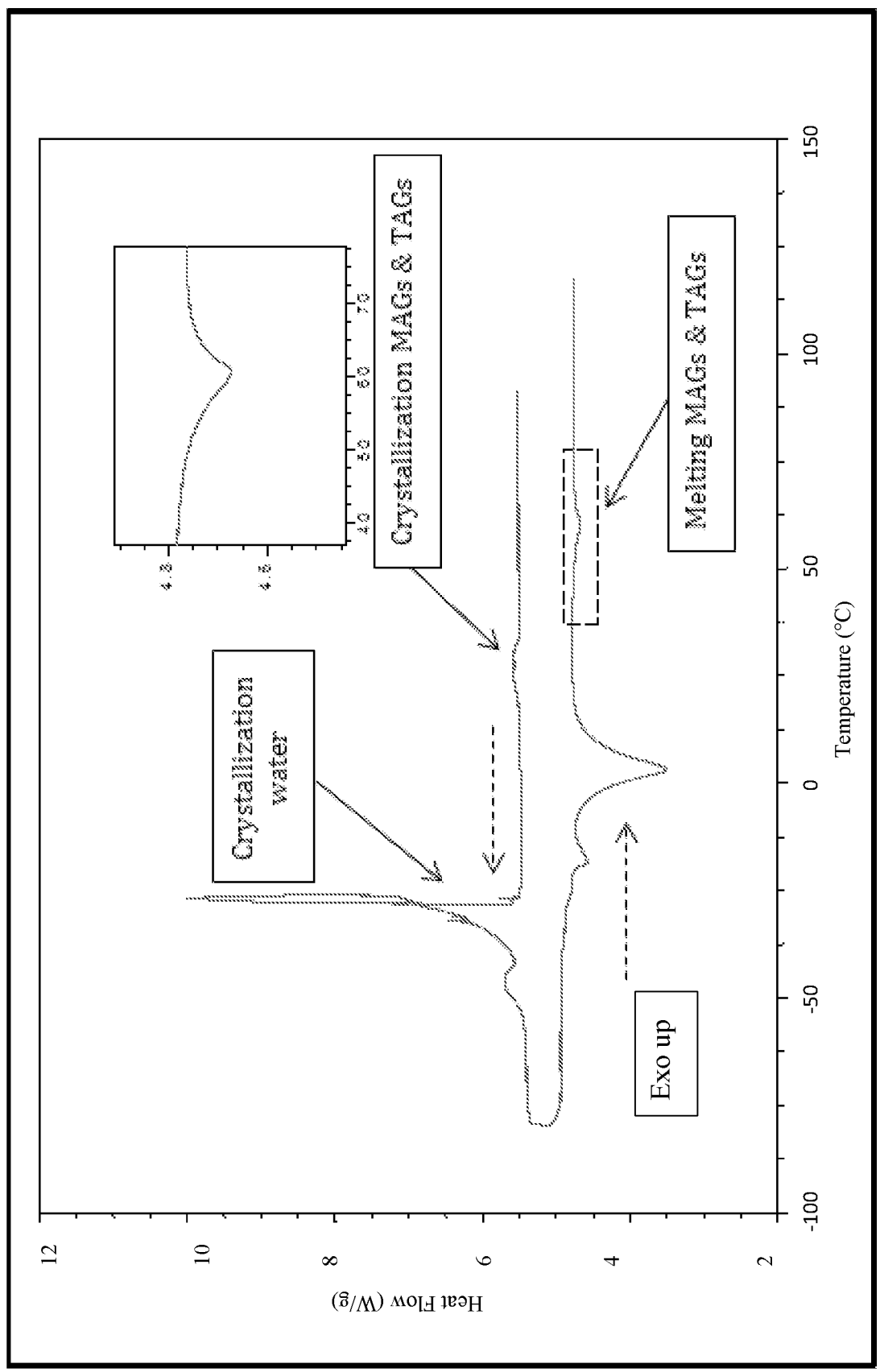
FIG. 10: Shows thermogram of temperature cycle 1 of residue after centrifugation.
Figure 11:
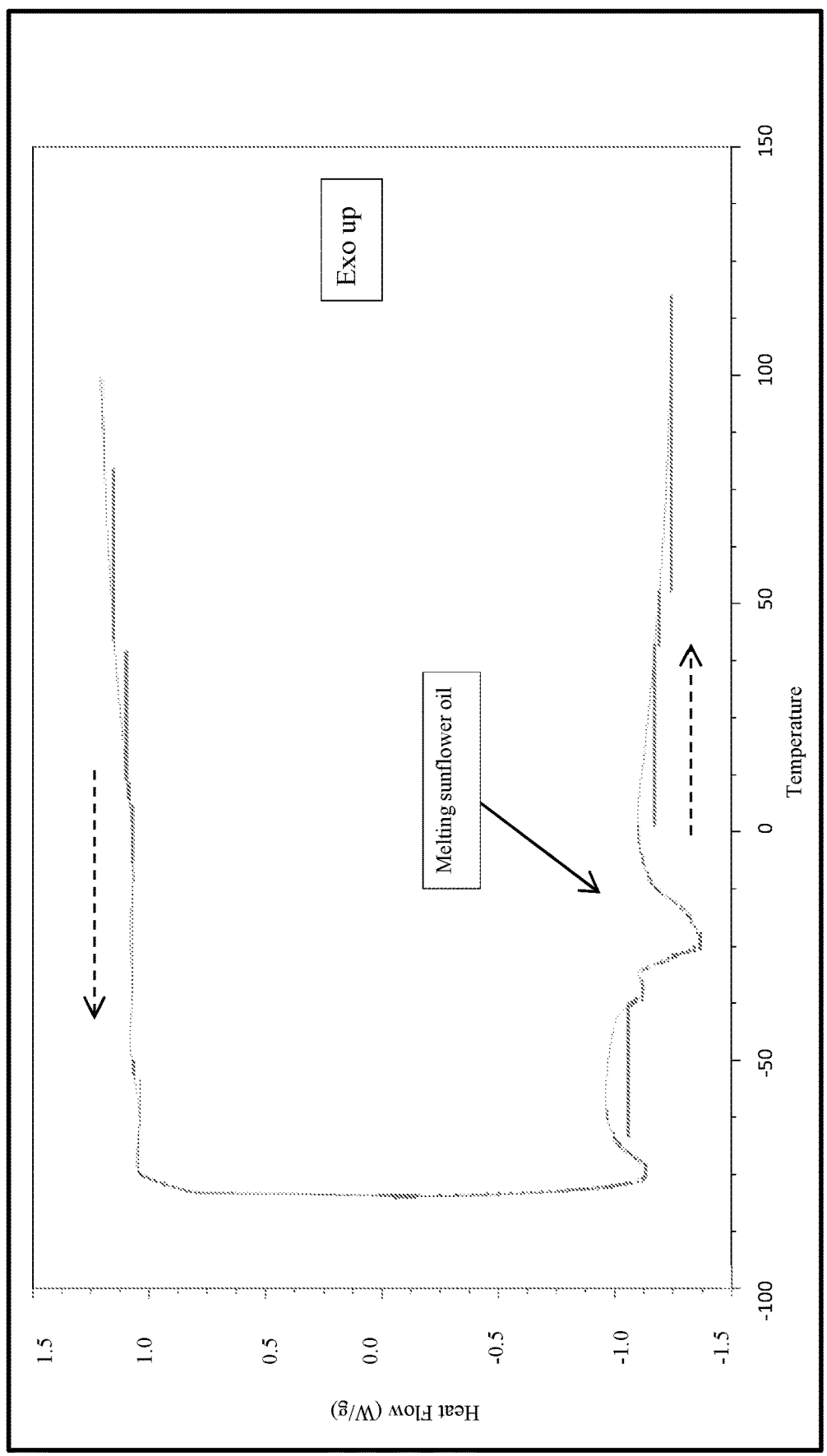
FIG. 11: Shows thermogram of temperature cycle 1 of supernatant after centrifugation.

The temperature cycling of the residue is presented in FIG. 10 and FIG. 11, respectively. The residue showed a sharp characteristic water crystallization peak (Tpeak −27° C.) during cooling which indicated that water resided in the residue which makes sense because water is higher in density than sunflower oil. This characteristic water peak was not found in the supernatant. It should be noticed that all the water was demulsified because the fats were molten during the heating step.

Furthermore, in the temperature cycling of the residue a crystallization peak (Tpeak 35° C.) appeared during cooling and a melting peak (Tpeak 60° C.) during heating appeared in the temperature-cycling which indicated that the MAGs and TAGs resided in the residue. These characteristic peaks for MAGs and TAGs were not found in the supernatant.

Lastly, the characteristic melting peak for sunflower oil (3) was not present in the residue sample.

Overall these results indicated that the high melting fats were associated with the water rather than the continuous phase and formed a crystal shell. Also, the low amount of sunflower oil in the residue sample proved that the emulsion could be concentrated by centrifugation.

Example 8

Water Droplet Characterization

Figure 12:
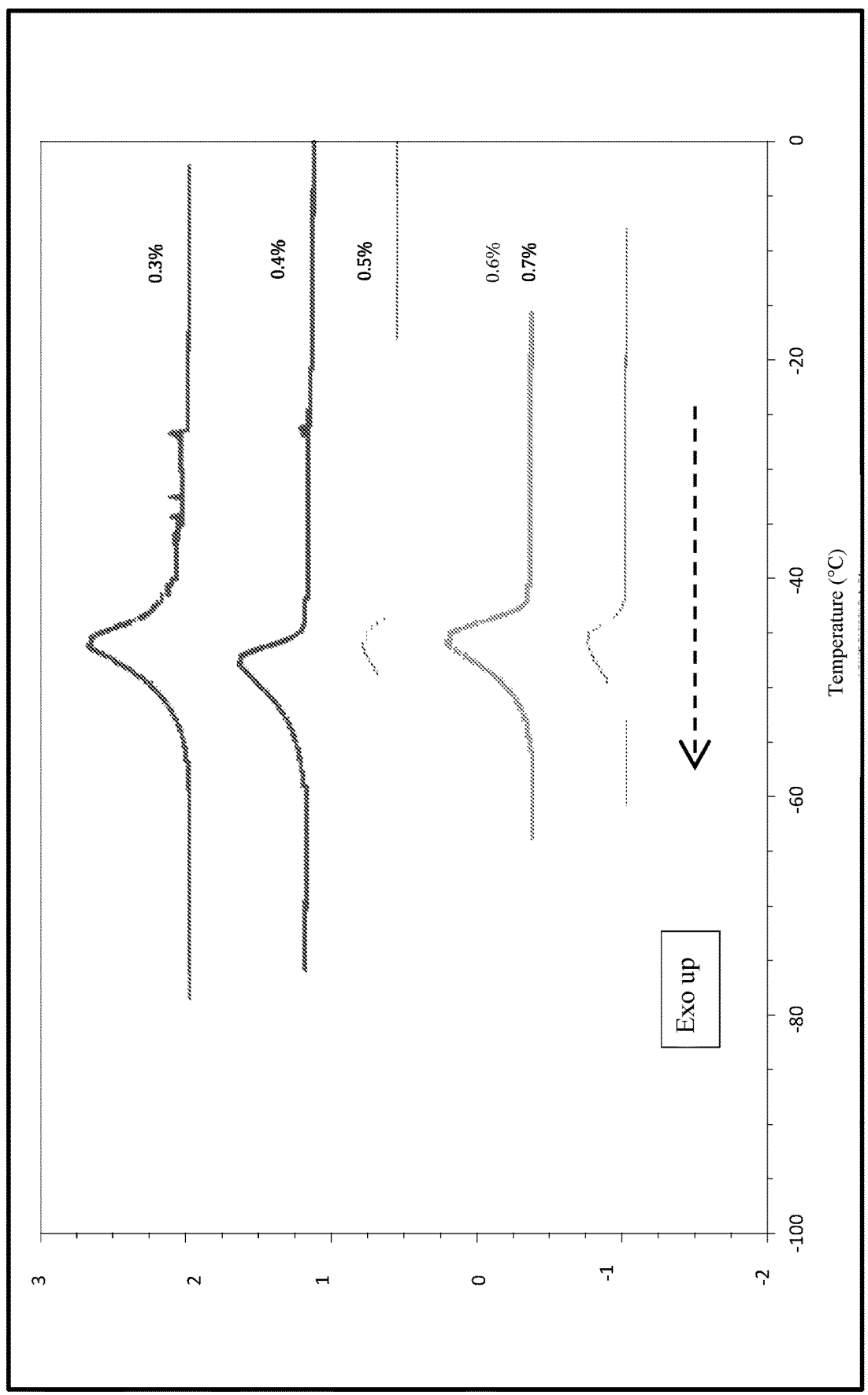
FIG. 12: Shows thermogram of the first freezing cycle for diluted emulsions with the specified wt % MAG concentrations.
Figure 13:
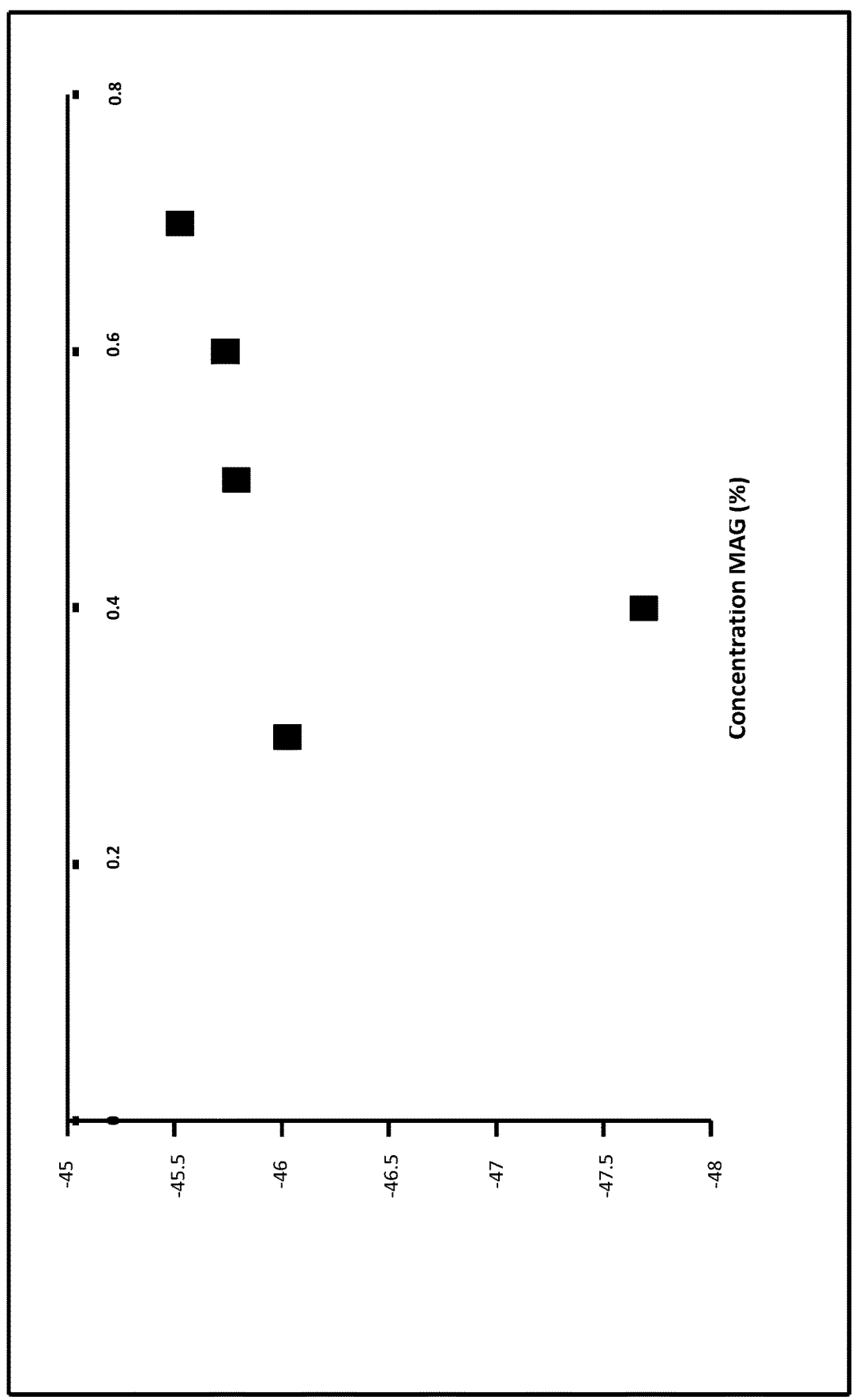
FIG. 13: Shows peak temperatures plotted against the MAG concentration for the emulsions specified in FIG. 12.

Emulsions with different concentrations MAG and TAG were prepared in a ratio 1:2.5. The emulsions were diluted, centrifuged and temperature cycled. The first freezing cycle is presented in FIG. 12. The peak temperatures are plotted versus the MAG concentration in FIG. 48. It can be seen that all the peak temperatures are very similar (−45.5° C.⇌−47.5° C.). There was no correlation between the concentration of emulsifier added and the peak temperature, i.e., droplet size. It can be seen that at concentrations of 0.3 and 0.4 wt % water there was non-encapsulated water. A minimum of 0.5 wt % MAG was required to prevent the formation of non-encapsulated water.

Example 9

50% Water in Oil Emulsion Using Sunflower Oil as Continuous Phase

Aqueous Phase
375 g demi water
Fat Phase
329.1 g sunflower oil
3.38 g PGPR
1.28 g SBK (MAG)
41.25 g Hydrogenated canola oil

TABLE 2

Emulsion composition by % wt for example 9.

| Example 9 | g | % |
| --- | --- | --- |
| Water | 375.00 | 50.00 |
| Sunflower oil | 329.10 | 43.88 |
| PGPR | 3.38 | 0.45 |
| SBK | 1.28 | 0.17 |
| Hydrogenated Canola oil | 41.25 | 5.50 |
|  | 750.00 | 100.00 |

Method
1. Blend the oil phase components together and heat them to 80° C. to obtain an homogeneous blend. Do the same in a separate beaker with the water phase components.
2. Bring the oil phase and the water phase together at 80° C. while mixing using a T25 UltraTurrax (IKA, Germany)

with a S25N-25-G dispersing element. Mixing time is about 30 seconds at 12000 RPM.
3. Pour the obtained emulsion in a double jacketed vessel at 70° C.
4. Cool the emulsion down to between 20° C. and 4° C. under constant stirring using an RW16 stirrer from IKA Labortechnik with a single bladed metallic propeller. Mixing speed is set at intensity 3 and cooling rate is set between 0.01° C./min and 0.5° C./min using a cooling bath.

Example 10

50% Water in Oil Emulsion Using Palm Oil as Continuous Phase

Aqueous Phase
375 g demi water
Fat Phase
329.1 g palm oil
3.38 g PGPR
1.28 g SBK (MAG)
41.25 g Hydrogenated canola oil

TABLE 3

Emulsion composition by % wt for example 10.

| Example 10 | g | % |
|---|---|---|
| Water | 375.00 | 50.00 |
| Palm oil | 329.10 | 43.88 |
| PGPR | 3.38 | 0.45 |
| SBK | 1.28 | 0.17 |
| Hydrogenated Canola oil | 41.25 | 5.50 |
| | 750.00 | 100.00 |

Method
Same as in example 9.

Example 11

50% Water in Oil Emulsion Using Cocoa Butter as Continuous Phase

Aqueous phase
375 g demi water
Fat Phase
329.1 g cocoa butter
3.38 g PGPR
1.28 g SBK (MAG)
41.25 g Hydrogenated canola oil

TABLE 4

Emulsion composition by % wt for example 11.

| Example 11 | g | % |
|---|---|---|
| Water | 375.00 | 50.00 |
| Cocoa butter | 329.10 | 43.88 |
| PGPR | 3.38 | 0.45 |
| SBK | 1.28 | 0.17 |
| Hydrogenated Canola oil | 41.25 | 5.50 |
| | 750.00 | 100.00 |

Method
Same as in example 9.

Example 12

30% Water in Oil Emulsion Using Palm Oil as Continuous Phase

Aqueous Phase
225 g demi water
Fat Phase
479.26 g palm oil
3.22 g PGPR
1.21 g SBK (MAG)
41.31 g Hydrogenated canola oil

TABLE 5

Emulsion composition by % wt for example 12.

| Example 12 | g | % |
|---|---|---|
| Water | 225 | 30.0 |
| Cocoa butter | 479.26 | 63.9 |
| PGPR | 3.22 | 0.4 |
| SBK | 1.21 | 0.2 |
| Hydrogenated Canola oil | 41.31 | 5.5 |
| | 750.0 | |

Method
Same as in example 9.

Example 13

40% Water in Oil Emulsion Using Cocoa Butter as Continuous Phase and Sugar Present in Aqueous Phase Aqueous Phase
105 g demi water
195 g sugar
Fat Phase
413.4 g cocoa butter
2.6 g PGPR
1 g SBK (MAG)
33.05 g Hydrogenated canola oil

TABLE 6

Emulsion composition by % wt for example 13.

| Example 13 | g | % |
|---|---|---|
| RO water | 105.0 | 14.0 |
| Sugar | 195.0 | 26.0 |
| Cocoa butter | 413.4 | 55.1 |
| PGPR | 2.6 | 0.3 |
| SBK | 1.0 | 0.1 |
| HCO | 33.05 | 4.4 |
| Total | 750 | |

Method
  Same as in example 9.

Example 14

Cocoa Filling

| Filling with cocoa powder | |
| --- | --- |
| Ingredient | g |
| Emulsion | 300.00 |
| Cocoa powder | 224.72 |
| Sugar | 200.00 |
| Cocoa butter | 200.81 |

| Filling with cocoa liquor | |
| --- | --- |
| Ingredient | g |
| Emulsion | 300.00 |
| Cocoa liquor | 425.53 |
| Sugar | 200.00 |

The emulsion is as described in example 12.

The emulsion is heated up from 25° C. to 40° C. at 0.75° C./minute.

The solids are mixed stepwise in the emulsion at 40° C. under stirring at low speed (400 rpm in IKA blender) as follows:

For the filling with cocoa powder:

Cocoa solids are mixed with sugar to form a homogeneous mixture

The cocoa butter is heated to 40° C.

The cocoa butter is added with the emulsion (at 40° C.) and stirred at low speed The cocoa solids+sugar mixture is added to the emulsion+cocoa butter mixture and stirred at low speed For the filling with cocoa liquor:

The cocoa liquor is heated to 40° C.

The cocoa liquor is mixed with sugar to homogeneous mixture (at 40° C.)

The emulsion is added to the coco liquor+sugar mixture at 40° C. and stirred at low speed.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A water-in-oil emulsion comprising:
   aqueous phase droplets formed in a continuous fat phase; and
   crystalline shells individually encasing one or more of the aqueous phase droplets, the crystalline shells comprising crystalline monoacylglycerols, crystalline triacylglycerols, and a non-crystallizing emulsifier,
   wherein the crystalline monoacylglycerols and the crystalline triacylglycerols each or together have a higher crystallization temperature than the continuous fat phase,
   wherein the crystalline shells collectively comprise from 0.5 to 10 wt % of the crystalline triacylglycerols, and from 0.1 to 5 wt % of the crystalline monoacylglycerols, and up to 3 wt % of the non-crystallizing emulsifier based on the total weight of the emulsion, and
   wherein the crystalline monoacylglycerols and the crystalline triacylglycerols crystalize separately from the continuous fat phase such that a network crystallization of the crystalline shells with the continuous fat phase is substantially avoided.

2. The emulsion according to claim 1, wherein the crystalline monoacylglycerols and the crystalline triacylglycerols comprise fatty acids with the same alkyl chain length or fatty acids with alkyl chains that differ in length by up to two carbons.

3. The emulsion according to claim 1, wherein the crystalline monoacylglycerols and the crystalline triacylglycerols comprise fatty acids which are fully saturated.

4. The emulsion according to claim 1, wherein the crystalline monoacylglycerols and crystalline triacylglycerols comprise the same fatty acids.

5. The emulsion according to claim 4, wherein the crystalline monoacylglycerols comprise glycerol monostearate and glycerol monopalmitate and the crystalline triacylglycerols comprise glycerol tristearate and glycerol tripalmitate.

6. The emulsion according to claim 1, wherein the difference between the crystallization temperature of the crystalline monoacylglycerols and the crystallization temperature of the crystalline triacylglycerols is at most 20° C.

7. The emulsion according to claim 1, wherein the crystalline monoacylglycerols and the crystalline triacylglycerols each or together have a crystallization temperature at least 8° C. higher than the crystallization temperature of the continuous fat phase.

8. The emulsion according to claim 1, wherein the aqueous phase includes dissolved solutes.

9. A chocolate confectionery composition comprising the emulsion of claim 1.

10. The emulsion according to claim 1, wherein the crystalline shells collectively comprise about 5.45 wt % of the crystalline triacylglycerols and about 0.16 wt % of the crystalline monoacylglycerols based on the total weight of the emulsion.

11. The emulsion according to claim 1, wherein the triacylglycerols are derived from fully hydrogenated canola oil and monoacylglycerols comprise glycerol monostearate.

12. The emulsion according to claim 1, wherein the triacylglycerols are derived from coconut oil, HPF, palm stearin, palm super stearin, shea stearin, lard, tallow, and SBK.

13. A confectionery composition comprising a water-in-oil emulsion, the emulsion comprising:
   aqueous phase droplets formed in a continuous fat phase; and
   crystalline shells individually encasing one or more of the aqueous phase droplets, the crystalline shells comprising crystalline monoacylglycerols, crystalline triacylglycerols, and a non-crystallizing emulsifier,
   wherein the crystalline monoacylglycerols and the crystalline triacylglycerols each or together have a higher crystallization temperature than the continuous fat phase;
   wherein the crystalline shells collectively comprise from 0.5 to 10 wt % of the crystalline triacylglycerols, and from 0.1 to 5 wt % of the crystalline monoacylglycerols, and up to 3 wt % of the non-crystallizing emulsifier based on the total weight of the emulsion, and
   wherein the crystalline monoacylglycerols and the crystalline triacylglycerols crystalize separately from the continuous fat phase such that a network crystallization of the crystalline shells with the continuous fat phase is substantially avoided.

14. The confectionery composition of claim 13, wherein the confectionery composition comprises chocolate.

15. The emulsion of claim 1, wherein the crystallization temperature of the crystalline monoacylglycerols and the crystallization temperature of the crystalline triacylglycerols is at least 23° C.

16. The emulsion of claim 1, wherein the emulsion comprises 10 to 60 wt % of the aqueous phase and 90 to 40 wt % of the continuous fat phase.

17. The emulsion of claim 1, wherein the emulsion comprises 20 to 50 wt % of the aqueous phase and 80 to 50 wt % of the continuous fat phase.

18. The emulsion of claim 1, wherein at least 90% of the aqueous phase droplets formed in the continuous fat phase are individually encased in crystalline shells.

19. The emulsion of claim 1, wherein at least 95% of the aqueous phase droplets formed in the continuous fat phase are individually encased in crystalline shells.

20. The emulsion of claim 1, wherein the crystalline monoacylglycerols and the crystalline triacylglycerols each or together have a crystallization temperature at least 20° C. higher than the crystallization temperature of the continuous fat phase.

* * * * *

UNITED STATES PATENT AND TRADEMARK OFFICE
CERTIFICATE OF CORRECTION

| | | |
|---|---|---|
| PATENT NO. | : 11,659,849 B2 | Page 1 of 1 |
| APPLICATION NO. | : 15/556901 | |
| DATED | : May 30, 2023 | |
| INVENTOR(S) | : Paul Raymond Smith et al. | |

It is certified that error appears in the above-identified patent and that said Letters Patent is hereby corrected as shown below:

On the Title Page

In Item "(56) References Cited", under "U.S. PATENT DOCUMENTS", Line 1, delete "5,989,818" and insert -- 5,989,618 --, therefor.

In the Specification

In Column 13, Lines 7-8, delete "C.rystallizer" and insert -- Crystallizer --, therefor.

Signed and Sealed this
Eighth Day of August, 2023

Katherine Kelly Vidal
*Director of the United States Patent and Trademark Office*